(12) United States Patent
Roth

(10) Patent No.: US 6,522,096 B1
(45) Date of Patent: Feb. 18, 2003

(54) CONTROL CIRCUIT FOR A ROBOT POWER SUPPLY

(75) Inventor: Stefan Roth, Eisenbrechtshofen (DE)

(73) Assignee: Kuka Roboter GmbH, Augsburg (DE)

( * ) Notice: Subject to any disclaimer, the term of this patent is extended or adjusted under 35 U.S.C. 154(b) by 0 days.

(21) Appl. No.: 09/514,854

(22) Filed: Feb. 28, 2000

Related U.S. Application Data

(63) Continuation-in-part of application No. 09/073,195, filed on May 6, 1998, now abandoned.

(30) Foreign Application Priority Data

May 28, 1997 (DE) .......................... 197 22 318

(51) Int. Cl.⁷ ................................. B25J 9/18
(52) U.S. Cl. .................... 318/568.1; 318/110; 318/111; 318/113; 318/254; 318/266; 318/49; 318/82; 318/568; 318/568.16; 318/568.18; 318/568.2; 318/565; 318/696
(58) Field of Search .............................. 318/568, 568.1, 318/568.16, 568.18, 568.2, 565, 254, 266, 110–113, 49, 82, 696, 10 R

(56) References Cited

U.S. PATENT DOCUMENTS

| | | | |
|---|---|---|---|
| 4,259,621 A | | 3/1981 | Jakobsen et al. |
| 4,289,997 A | | 9/1981 | Jung et al. |
| 4,454,457 A | | 6/1984 | Nakamura et al. |
| 4,633,414 A | * | 12/1986 | Yabe et al. .................. 364/513 |
| 4,675,582 A | | 6/1987 | Hommes et al. |
| 4,706,001 A | * | 11/1987 | Nakashima et al. ........ 318/568 |
| 4,757,245 A | | 7/1988 | Ayers et al. |
| 4,794,513 A | | 12/1988 | Müller |
| 4,825,133 A | * | 4/1989 | Tanuma et al. ............. 318/113 |
| 4,990,022 A | * | 2/1991 | Watanabe et al. ........... 403/349 |
| 5,052,799 A | * | 10/1991 | Sassar et al. ............... 356/152 |
| 5,086,262 A | * | 2/1992 | Hariki et al. ............. 318/568.1 |
| 5,619,111 A | | 4/1997 | Katagiri et al. |
| 5,661,826 A | * | 8/1997 | Saito et al. .................... 385/17 |
| 5,760,560 A | * | 6/1998 | Ohya et al. ............... 318/568.1 |
| 5,765,040 A | * | 6/1998 | Uno et al. .................. 395/866 |
| 5,944,609 A | * | 8/1999 | Crane et al. .................. 463/62 |
| 6,247,994 B1 | * | 6/2001 | DeAngelis et al. ......... 446/454 |

FOREIGN PATENT DOCUMENTS

| | | |
|---|---|---|
| DE | 4224755 | 2/1994 |
| DE | 19522933 | 6/1995 |
| EP | 0376738 | 7/1990 |
| GB | 2283836 | 5/1995 |

OTHER PUBLICATIONS

Phillip Laplante, "Comprehensive Dictionary of Electrical Engineering" CRC Press/IEEE Press 1998, p. 159.*

* cited by examiner

Primary Examiner—Robert E. Nappi
Assistant Examiner—Tyrone W Smith
(74) Attorney, Agent, or Firm—Antonelli, Terry, Stout & Kraus, LLP

(57) ABSTRACT

A mechanism controller for controlling power to motors of a mechanism having several motors, such as a robot. Each motor has a resolver for indicating the motor position. A driver unit is associated with each motor to supply power to the motor. Each driver unit includes a monitoring unit to monitor indications from the resolver of the associated motor. In one embodiment a control unit is connected to the driver units in a series circuit to control power to the motors and to receive the monitored indications from the monitoring units. In a second embodiment, the control unit is connected to the driver units in a ring circuit, rather than in a series circuit. Preferably, each driver unit also includes a memory device, and the control unit can send commands to the driver units and receive data from the driver units in sets equal in number to the number of driver units so that the commands and data do not need to include the addresses of the specific driver units. Alternatively, the commands and data can include a driver unit address so that the commands and data can be individually sent, rather than sent in sets.

8 Claims, 3 Drawing Sheets

CONTROL CIRCUIT FOR A ROBOT POWER SUPPLY

CROSS REFERENCE TO RELATED APPLICATION

This application is a continuation-in-part of U.S. patent application Ser. No. 09/073,195 filed May 6, 1998 now abandoned.

FIELD OF THE INVENTION

The present invention relates to apparatus for controlling motors of a mechanism having several motors. More particularly, the present invention relates to apparatus for monitoring and controlling power supplied to motors of a mechanism, such as a robot, which has several motors.

BACKGROUND OF THE INVENTION

Various mechanisms, such as robots, have several motors to power their operation. Hitherto such mechanisms, including robots, have been provided with a single power supply device common to all the motors of the mechanism. Servo-amplifiers have been located in a common switch cabinet which, due to its size and weight, is installed outside the mechanism work space. The servo-amplifiers are controlled with analog signals or field buses.

This is disadvantageous in that high cabling expenditure is involved. In addition, electromagnetic and line-linked disturbances or interference cannot be excluded and must be taken into consideration. High costs are also involved for cooling and safety assurance. The known power parts also have a high space requirement and are not flexible as regards handling or extension.

The problem addressed by the present invention is, consequently, to provide an apparatus for the control of power suppled to motors of a mechanism having several motors which apparatus, while avoiding the aforementioned disadvantages, requires only a very low expenditure, particularly with regards to cabling, and whose operation gives rise to minimum electromagnetic and line-linked interference and provides improved monitoring and control of the motors, while having high efficiency.

SUMMARY OF THE INVENTION

In accordance with the present invention, each motor of an installation having several motors is provided with its own driver unit, and the driver units are interconnected with each other and with a control unit by means of a series circuit or of a ring circuit. In one preferred embodiment, each driver unit is preferably provided with a memory device, such as a shift register, to store commands and/or data transmitted from and to the control unit. As a result of the subdivided design of the power supply through the use of individual driver units for each motor and the connection thereof with the control unit by means of a ring circuit or a series circuit, it is possible to position the individual driver units close to the mechanism, and in particular close to the individual motors associated therewith. This results in minimum cabling costs. Additionally, electromagnetic and line-linked interference are significantly reduced, because only limited interference is caused by the short motor lines. As a result of the subdivided arrangement of the driver units, the costs for cooling and assuring the necessary safety are kept low. The driver units have a limited space requirement, and the number of motors and driver units can be modified economically and in a flexible manner.

According to one preferred embodiment, the driver units are connectable directly to a voltage network by means of a mains line. As a result, power can be provided directly by the power line or mains voltage, so long as the mains voltage and the control unit voltage are compatible, such as is the case with a control unit voltage in 600 V technology with respect to the European three-phase 400V supply network. This reduces the power distribution costs, and the supply voltage can easily be handled, particularly switched and connected. A further advantage of the invention is that the dissipated heat can be removed in a passive manner, and consequently there is no need for active cooling elements such as fans or heat exchangers. According to a preferred development, the driver units have their own rectifiers and are consequently self-sufficient.

As a result of the interconnection of the driver units by means of a ring circuit or a series circuit, all the driver units are interlinked by a rapid, deterministic bus, which can be connected to the control unit by means of existing SSI interfaces. A repeater function is obtained, in which each driver unit automatically becomes a separation point or break, to which it is possible to connect a communication cable without any technical limitations, and consequently flexible extendability exists in the application. This also permits simple monitoring of the functioning of the individual driver units.

If a command or data is sent on the ring circuit or the series circuit, but a particular driver unit has failed, i.e. the control unit receives no reply after a given, critical time, or if the ring circuit or series circuit has a fault, the control unit recognizes that a fault exists and can stop the mechanism in an appropriate manner. Another advantage of the ring or series architecture according to the invention is that addressing of the driver units is possible by their position in the circuit, and consequently there can be a logic association by software, so that it is not necessary for the individual driver units to have specified addresses. However, if desired, each driver unit can have an address, with each transmission from the control unit including the address of the intended driver unit.

In the series architecture driver units are connected to each other and to the control unit by both an outgoing line and a return line. Thus, the control unit is connected to a first driver unit by means of an outgoing line and a return line, the first driver unit is connected with a second driver unit by an outgoing line and return line, and the second driver unit and further driver units are connected to their respective following driver units by respective outgoing lines and return lines.

In the ring architecture, the driver units are connected to each other and to the control unit in series by an outgoing line from the control unit, the return line going directly from the last driver unit in the ring back to the control unit. Thus, the control unit is connected to a first driver unit by means of an outgoing line, the first driver unit is connected with a second driver unit by an outgoing line, and the second driver unit and possibly further driver units are connected to their respective following driver units by respective outgoing lines. A return line from the last driver unit in the ring is connected directly back to the control unit.

According to a preferred embodiment, the ring circuit or the series circuit is formed by symmetrical pairs of wires or optical waveguides. Such a line has a high disturbance immunity, which is not the case with two parallel lines, because the latter cannot be twisted and symmetrized.

According to another preferred embodiment, each driver unit has its own signal processor. By means of the signal processor the driver unit communicates with the control unit, to which it is connected by the ring or series circuit. According to another preferred embodiment, monitoring units for monitoring pick-ups are integrated into the driver units.

In a further preferred embodiment, each driver unit includes a memory device, such as a shift register, which enables the driver unit to store commands and/or data received from or to be sent to the control unit. The commands or data can be positioned in the data flow in accordance with the position of the driver unit in the ring circuit or the series circuit so that no address is necessary for the driver unit. Alternatively, each driver unit can be identified by an unique address, and the commands or data can include the address of the particular driver unit to which or from which the commands or data are being transmitted. These approaches permit transmission of commands or data from the control unit to each driver unit and/or from each driver unit to the control unit.

As a result of the inventive construction of subdivided driver units advantageously connected by means of a ring circuit or a serial circuit, despite the low cost a high disturbance immunity is obtained. As a result of the ring or series structure of the circuit, there is no need for address configuration by the user. The possibility exists of communicating large data quantities over considerable distances, so that it is possible to remove the driver units from the control unit and operate the driver units as independent units. The ring circuit or series circuit also aids circuit efficiency, in that it is possible to interconnect any number of driver units. As stated, the driver units can be located directly at the drives of the mechanism, and yet even in subdivided systems of considerable size, short motor lines are possible. Thus, the mechanism configuration has no influence on the electromagnetic compatibility and the line-linked disturbances.

The present invention also provides a control circuit capable of efficiently exchanging messages between the control unit and each of the driver units so as to enhance the control.

BRIEF DESCRIPTION OF THE DRAWINGS

Further advantages and features of the invention can be gathered from the claims and following description of preferred embodiments of the invention, with reference to drawings, in which:

DETAILED DESCRIPTION

While the present invention is usable to control the motors of any of numerous different types of mechanisms having several motors, the following detailed description will be made with particular reference to control of several motors of a robot, but the invention is not limited in that respect.

Figure 1:
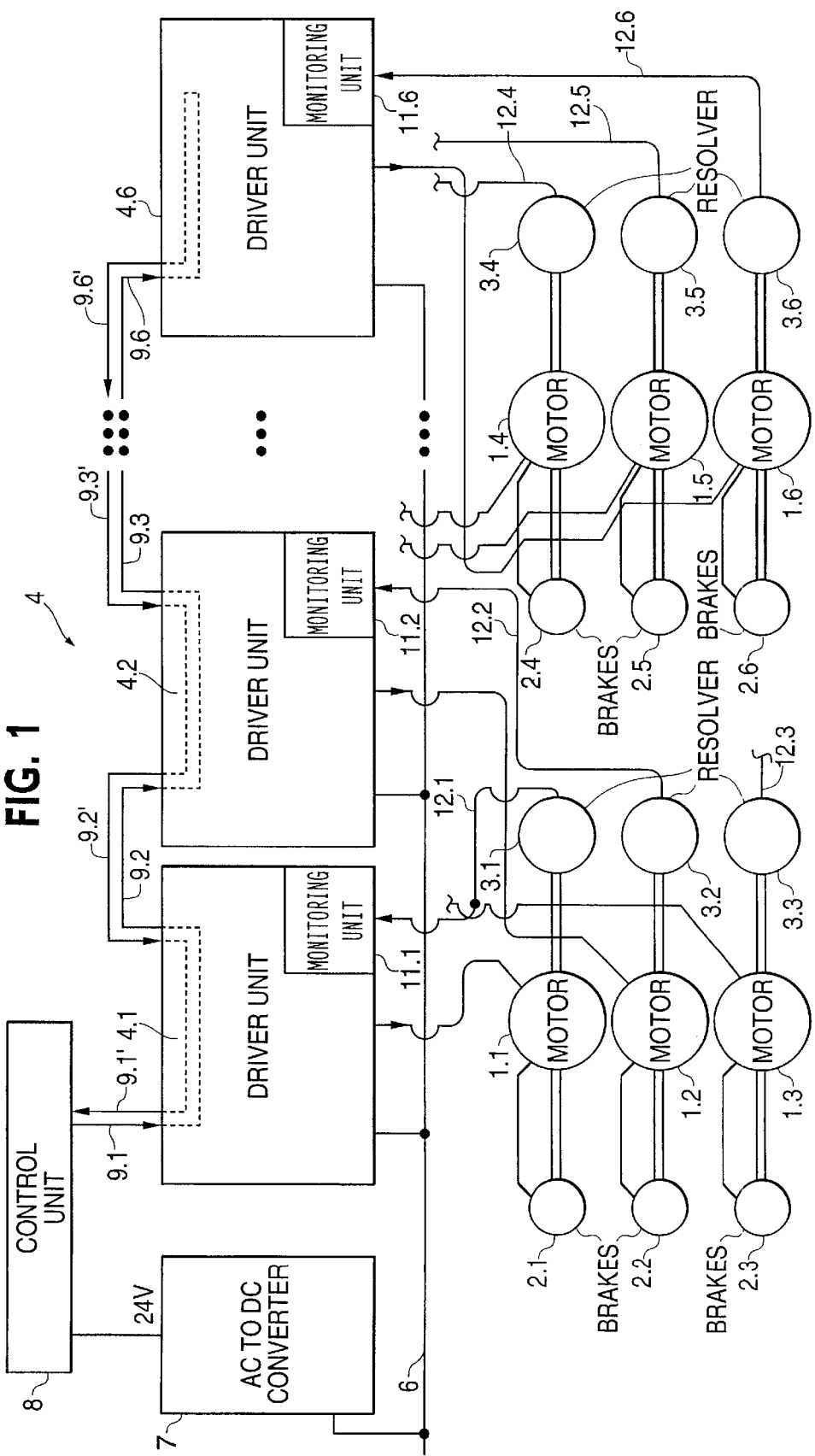
FIG. 1 is a schematic block diagram of a first embodiment of a controller for a mechanism having several motors.

In one standard construction, as depicted in FIG. 1, a robot generally has six motors 1.1 to 1.6 with brakes 2.1 to 2.6, so that the motors 1.1 to 1.6 are constructed as brake motors. They are used for controlling the normally six axes or shafts of the robot. If additional axes or shafts are provided, further motors can be present and be supplied in the same way within the scope of the invention, as described hereinafter. With each motor 1.1 to 1.6 is associated a resolver 3.1 to 3.6, which establishes the position of the corresponding motor, and consequently of the robot axes controlled by such motor. For supplying the motors with power, a driver 4 is provided, which according to the invention is constituted by individual driver units 4.1–4.6 or servo-amplifiers, each driver unit 4.1–4.6 being associated with a corresponding one of the motors 1.1–1.6. (For ease of viewing in the drawings only the driver units 4.1, 4.2 and 4.6 are shown, the other driver units being indicated by dotted lines.) In the embodiment shown, the driver units 4.1–4.6 are directly connected by means of a mains power line 6 to the voltage network. This is possible if the driver units 4.1–4.6 are constructed in technology so as to permit a direct connection to the mains. This also leads to the advantage that it is only necessary to supply an alternating or three-phase voltage to the robot or its motors. An adapting unit in the form of a transformer can be provided for voltage adaptation purposes with different types of networks, if necessary.

There is also mains converter part 7, with which the mains voltage supplied by means of the line 6 is converted into a 24 V d.c. control voltage, which is e.g. used for supplying a control unit 8 in the form of a microprocessor based, digital control unit. In the embodiment of FIG. 1, apart from the construction of the power supply device by modular driver units 4.1–4.6 for each motor 1.1–1.6, a further essential point of the invention is the connection of the driver units 4.1–4.6 to one another and to the control unit 8 by means of a series circuit 9.1, 9.1'–9.6, 9.6', which is designed in such a way that an outgoing line 9.1 and a return line 9.1' pass from the control unit 8 to the first driver unit 4.1, from the latter an outgoing line and a return line 9.2, 9.2' pass to the second driver unit 4.2, from the latter pass an outgoing and a return line 9.3, 9.3' to the next driver unit, etc., up to the sixth or final driver unit 4.6 at which the outgoing line 9.6 is tied to the return line 9.6'. (Again, for ease of viewing lines 9.4, 9.4', 9.5, and 9.5' are indicated by dotted lines.)

In the driver units 4.1–4.6 are also integrated monitoring units 11.1–11.6 for the resolvers 3.1–3.6, the connection between the monitoring units 11.1–11.6 and the resolvers 3.1–3.6 taking place by means of pairwise twisted lines 12.1–12.6.

Figure 2:
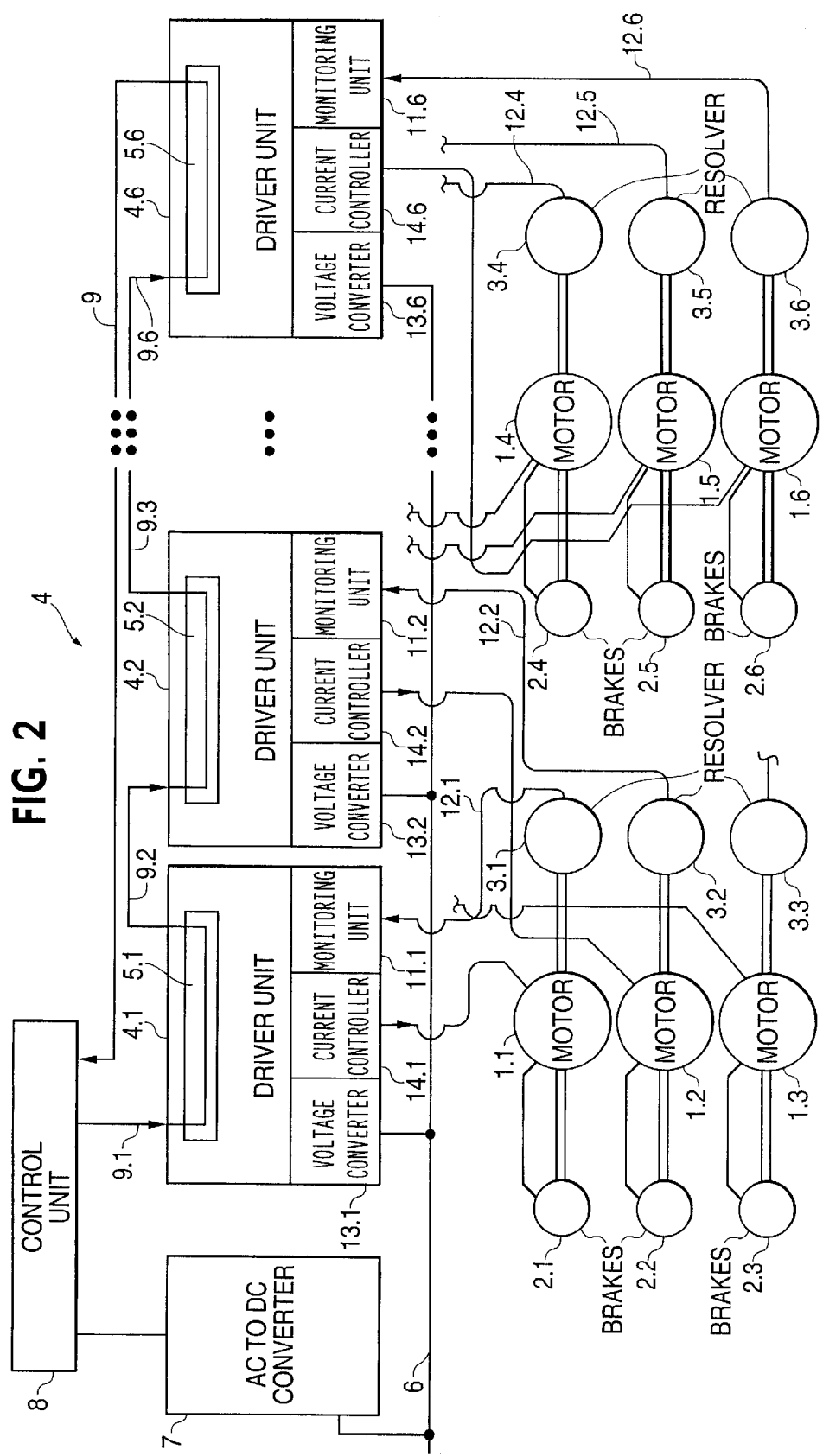
FIG. 2 is a schematic block diagram of a second embodiment of a controller for a mechanism having several motors.

FIG. 2 depicts a second embodiment of an apparatus for supplying power to motors of an mechanism having a plurality of motors, in accordance with the present invention. This embodiment differs from the embodiment of FIG. 1 in the construction of the driver units 4.1–4.6 and their interconnection by the lines 9, 9.1–9.6 to control unit 8, and so the other portions of the circuitry are not described hereinafter in detail. Each driver unit 4.1–4.6 includes a memory device 5.1–5.6., a voltage converter 13.1–13.6, and a current controller 14.1–14.6, as well as a monitoring unit 11.1–11.6. The power from mains power line 6 is applied to the driver units 4.1–4.6 through voltage converters 13.1–13.6. The current from the driver units 4.1–4.6 to the motors 1.1–1.6 is applied through current controllers 14.1–14.6. As in the embodiment of FIG. 1, the outputs of resolvers 3.1–3.6 are applied through monitoring units 11.1–11.6.

Each driver unit 4.1–4.6 also includes a memory device 5.1–5.6 such as a shift register. Control unit 8 and the driver units 4.1–4.6 are connected in a ring circuit. That is, control unit 8 is connected to driver unit 4.1 by line 9.1, driver unit 4.1 is connected to driver unit 4.2 by line 9.2, and this connection pattern continues, with the last driver unit in the sequence, depicted in FIG. 2 as a driver unit 4.6, being connected to its preceding driver unit by line 9.6. The last driver unit in the sequence, depicted as driver unit 4.6, is connected back to control unit 8 by line 9. Within each driver unit, the connection runs through the respective memory device 5.1–5.6. Thus, line 9.1 enters shift register 5.1 in driver unit 4.1, line 9.2 exits shift register 5.1 in driver unit 4.1 and enters shift register 5.2 in driver unit 4.2. This pattern continues, with line 9.6 entering shift register 5.6 in driver unit 4.6, and with return line 9 exiting shift register 5.6 and driver unit 4.6 and being connected back to control unit 8.

Control unit 8 sends commands and/or data to the driver units 4.1–4.6 and receives data from the six driver units on lines 9.1–9.6. In one preferred embodiment, commands and/or data to or from the six driver units 4.1–4.6 are transmitted in groups of six. For example, each group of six commands from control unit 8 is transmitted on lines 9.1–9.6 until the first command in the series is within memory device 5.6 of driver unit 4.6. The six sets of commands are then within the memory units 5.1–5.6 of the respective driver units 4.1–4.6, and each driver unit acts on its respective command.

By way of example, the commands might command each of the various driver units to adjust the current flowing from its respective current controller 14.1–14.6 to its respective motor 1.1–1.6 so as to control operation of that motor, and thus to control operation of the robot. Alternatively, each command might instruct the driver unit to transmit back to the control unit data from the respective monitoring unit 11.1–11.6. In such case, the data from each monitoring unit is applied to the respective memory unit 5.1–5.6, and then the data is sent through the ring circuit back to control unit 8. The data is sent in a group of six data sets, one from each monitoring unit 11.1–11.6, indicating the status of the six motors 1.1–1.6 as indicated by the resolvers 3.1–3.6. This enables the processor within control unit 8 to determine what commands should next be sent to the driver units 4.1–4.6.

Figure 3:
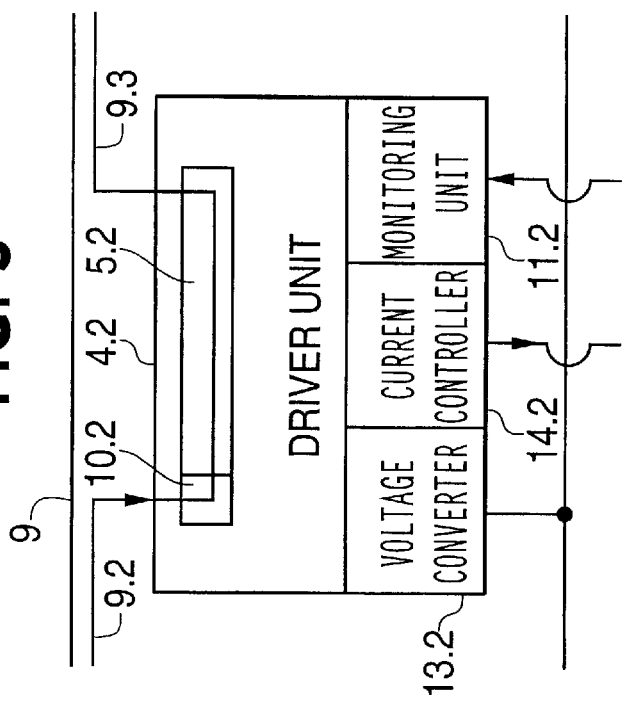
FIG. 3 is a fragmentary schematic block diagram of a third embodiment of a controller for a mechanism having several motors.
Figure 4:
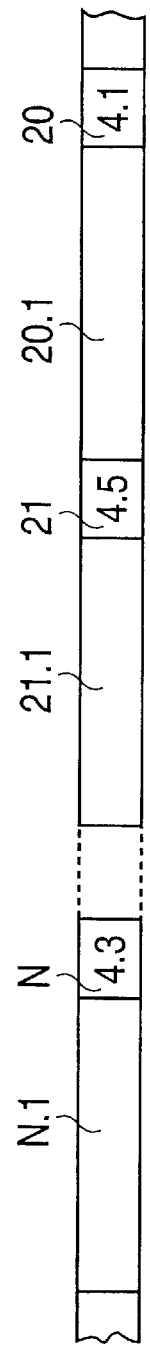
FIG. 4 illustrates a sequence of messages that might be sent between the control unit to the driver units of an apparatus in accordance with a preferred embodiment of the invention.

FIG. 3 depicts an alternative embodiment in which each driver unit 4.1–4.6 includes an address detector 10.1–10.6 in addition to a memory device 5.1–5.6. In such embodiment, control unit 8 can then send commands to individual ones of the driver units, rather than sending commands in sets of six. Each command is headed by an address to indicate which driver unit 4.1–4.6 the command is for. FIG. 4 illustrates such transmission. Thus, a series of commands sent on lines 9.1–9.6 might include a first address 20 followed by the related command 20.1, a second address 21, followed by a related command 21.1, and so forth. In FIG. 4, address 20 indicates that command 20.1 is for driver unit 4.1, address 21 indicates that command 21.1 is for driver unit 4.5, and address N indicates that command N.1 is for driver unit 4.3. The use of the addresses makes it possible to send the commands in any sequence desired, rather than in a group of commands equal in number to the number of driver units in the ring circuit.

It can thus be seen that the present invention provides an improved apparatus for controlling the motors of a mechanism having several motors in that the invention permits driver units for the motors to be connected in a manner permitting ready addition or removal of motors and their related driver units, and permitting easy transmission of commands to and receipt of data from the driver units.

Although the present invention has been described with reference to preferred embodiments, rearrangements, alterations, and substitutions could be made, and still the result would be within the scope of the invention.

What is claimed is:

1. An apparatus for supplying power to motors of a mechanism having a plurality of motors, said apparatus comprising:

a like plurality of driver units, each driver unit adapted to be connected to a uniquely associated one of the motors to supply power thereto, each driver unit having a shift register memory;

a control unit; and a communication line interconnecting said control unit and the shift register memories in said plurality of driver units in a ring circuit to permit said control unit and said driver units to communicate with each other by transmitting a group of a like plurality of communications in the form of commands and/or data to be simultaneously stored in respective ones of the shift register memories for execution of the commands by corresponding ones of said driver units.

2. An apparatus as claimed in claim 1, wherein:

each motor has a resolver;

each of said driver units includes a monitoring unit for monitoring indications from the resolver of the associated motor; and said communication line permits said control unit to receive the monitored indications from said monitoring units.

3. An apparatus according to claim 1, wherein said communication line comprises symmetrical pairs of wires or optical waveguides.

4. A mechanism controller, comprising:

a plurality of motor units for controlling a mechanism, each motor unit including a motor for moving a movable part of the mechanism;

a like plurality of driver units, each driver unit connected to a uniquely associated one of the motors to supply power thereto, each driver unit having a shift register memory;

a control unit; and a communication line interconnecting said control unit and the shift register memories in said plurality of driver units in a ring circuit to permit said control unit and said driver units to communicate with each other by transmitting a group of a like plurality of communications in the form of commands and/or data to be simultaneously stored in respective ones of the shift register memories for execution of the commands by corresponding ones of said driver units.

5. A mechanism controller as claimed in claim 4, wherein:

each of said motor units further includes a resolver for indicating the motor position;

each of said driver units includes a monitoring unit for monitoring indications from the associated resolver; and said communication line permits said control unit to receive the monitored indications from said monitoring units.

6. A mechanism controller according to claim 4, wherein said communication line comprises symmetrical pairs of wires or optical waveguides.

7. A mechanism controller as claimed in claim 4, wherein said plurality of motor units control a robotic mechanism.

8. An apparatus according to claim 1, wherein:
each of said driver units includes a monitoring unit for monitoring an indication of the motor position of the associated motor; and
said control line permits said control unit to receive the monitored indications from said monitoring units.

* * * * *